United States Patent
Wei

(10) Patent No.: US 9,588,655 B2
(45) Date of Patent: Mar. 7, 2017

(54) DATA INTERFACE CONFIGURATION METHOD AND TERMINAL DEVICE

(71) Applicant: Huawei Device Co., Ltd., Shenzhen, Guangdong (CN)

(72) Inventor: Lei Wei, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 742 days.

(21) Appl. No.: 14/051,657

(22) Filed: Oct. 11, 2013

(65) Prior Publication Data

US 2014/0040290 A1 Feb. 6, 2014

Related U.S. Application Data

(63) Continuation of application No. PCT/CN2011/073049, filed on Apr. 20, 2011.

(51) Int. Cl.
*G06F 3/00* (2006.01)
*G06F 15/00* (2006.01)
(Continued)

(52) U.S. Cl.
CPC .......... *G06F 3/0484* (2013.01); *G06F 9/54* (2013.01); *H04L 41/0226* (2013.01);
(Continued)

(58) Field of Classification Search
CPC .................................. G06F 9/54; G10L 17/00
(Continued)

(56) References Cited

U.S. PATENT DOCUMENTS 6,295,391 B1 * 9/2001 Rudd ........................ G06F 3/16
381/110
6,625,472 B1 9/2003 Farazmandnia et al.
(Continued)

FOREIGN PATENT DOCUMENTS

CN 101222697 A 7/2008
CN 101287219 A 10/2008
(Continued)

OTHER PUBLICATIONS

Joseph B. Evans, Adaptive Voice/Data Networks, Sep. 29, 1994.*
(Continued)

*Primary Examiner* — Lechi Truong
(74) *Attorney, Agent, or Firm* — Conley Rose, P.C.

(57) ABSTRACT

Embodiments of the present invention disclose a data interface configuration method and a terminal device. The configuration method includes: receiving, by a second device, an application program command word sent by a first device; parsing the application program command word, to obtain a type of a function module corresponding to the application program command word according to a preset mapping relationship; and connecting a data interface to a corresponding function module according to a parsing result; where the data interface is a data interface on the second device, and the function module is a function module in the second device. By using solutions provided by the present invention, a terminal device may automatically configure a data interface according to an application program that currently needs to be run on a computer side.

13 Claims, 5 Drawing Sheets

(51) Int. Cl.
  *G06F 3/0484* (2013.01)
  *G06F 9/54* (2006.01)
  *H04L 12/24* (2006.01)
  *H04L 29/08* (2006.01)
  *H04M 1/725* (2006.01)

(52) U.S. Cl.
  CPC .......... *H04L 41/04* (2013.01); *H04L 41/0803* (2013.01); *H04L 41/0816* (2013.01); *H04L 67/34* (2013.01); *H04M 1/72527* (2013.01); *H04L 69/32* (2013.01)

(58) Field of Classification Search
  USPC .......................................... 719/310; 704/200
  See application file for complete search history.

(56) References Cited

U.S. PATENT DOCUMENTS

| | | | |
|---|---|---|---|
| 6,907,265 B1 | 6/2005 | Holmstrom et al. | |
| 2009/0254839 A1* | 10/2009 | Kripalani | G06F 3/0231 715/753 |

FOREIGN PATENT DOCUMENTS

| | | | |
|---|---|---|---|
| CN | 101437251 A | | 5/2009 |
| CN | 101477509 A | | 7/2009 |
| CN | 103118176 A | * | 5/2013 |
| EP | 2007109 A1 | | 12/2008 |
| WO | 0044186 A1 | | 7/2000 |

OTHER PUBLICATIONS

Foreign Communication From A Counterpart Application, European Application No. 11750206.2, Extended European Search Report dated Jul. 10, 2014, 6 pages.

Foreign Communication From A Counterpart Application, PCT Application PCT/CN2011/073049, International Search Report dated Sep. 15, 2011, 3 pages.

Foreign Communication From A Counterpart Application, PCT Application PCT/CN2011/073049, Written Opinion dated Sep. 15, 2011, 4 pages.

Foreign Communication From A Counterpart Application, Chinese Application No. 201180000358.9, Chinese Office Action dated Sep. 4, 2012, 8 pages.

* cited by examiner

DATA INTERFACE CONFIGURATION METHOD AND TERMINAL DEVICE

CROSS-REFERENCE TO RELATED APPLICATION

This application is a continuation of International Application No. PCT/CN2011/073049, filed on Apr. 20, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of terminal technologies, and in particular, to a data interface configuration method and a terminal device.

BACKGROUND

Portable terminals such as a mobile phone, a personal digital assistant (PDA), and a handheld game console are necessary tools for many users in their daily lives. With the continuous development of terminal technologies, a user may not only use a terminal device alone, but may also implement more ample extended function applications by connecting a terminal device to a personnel computer. For example, a terminal device synchronizes data with a computer, a computer uses a terminal device to achieve network access, and a computer uses a terminal device to implement a global positioning system (GPS), or the like.

There are a plurality of applications between a terminal device and a computer. In addition, many running application programs need to exclusively occupy the data interface between the terminal device and the computer. Generally, a terminal device provides only one data interface. In this case, the data interface needs to be configured according to the application program that needs to run currently, for achieving a multiplexing mode of the data interface.

In the prior art, configuration for a data interface is achieved through pre-delivering a handover command. For example, after a terminal device is connected to a computer, a selection menu is displayed on the screen of the terminal device, querying a user which application needs to be executed. The terminal device connects the data interface to the corresponding function module according to the application selected by the user, to implement configuration for the data interface, and then prompts the user to start executing the application program. The disadvantage of this method is as follows: A user needs to perform manual handover to implement configuration for the data interface. If the user needs to execute different applications, the user needs to perform selection again. Such an operation is complex and causes inconvenience to the user.

SUMMARY

To solve the above technical problems, embodiments of the present invention provide a data interface configuration method and a terminal device to implement that a terminal device automatically configures a data interface according to an application program that currently needs to be run on a computer side. The technical solutions are as follows:

A data interface configuration method includes: receiving, by a second device, an application program command word sent by a first device; parsing the application program command word; and according to a preset mapping relationship, obtaining a type of a function module corresponding to the application program command word; connecting a data interface to a corresponding function module according to a parsing result; where the data interface is a data interface on the second device, and the function module is a function module in the second device.

Accordingly, an embodiment of the present invention further provides a terminal device, including: a command word receiving unit configured to receive an application program command word sent by a first device; a command word parsing unit configured to parse the application program command word to obtain a type of a function module corresponding to the application program command word; and a data interface configuration unit configured to connect a data interface to a corresponding function module according to a parsing result of the command word parsing unit.

By using the above technical solutions, after a terminal device is connected to a computer, a user does not need to perform manual configuration, and may directly start an application program on a computer side; and the terminal device identifies, according to an application program command word sent by the computer side, an application program that currently needs to be run and connects a data interface to a corresponding function module. Besides, when the user needs to change the application program that is currently executed, the user only needs to directly start a corresponding application program on the computer side; and the terminal device may determine the change of the application program according to the change of a command word format, so that the terminal device automatically configures the data interface.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

Figure 1:
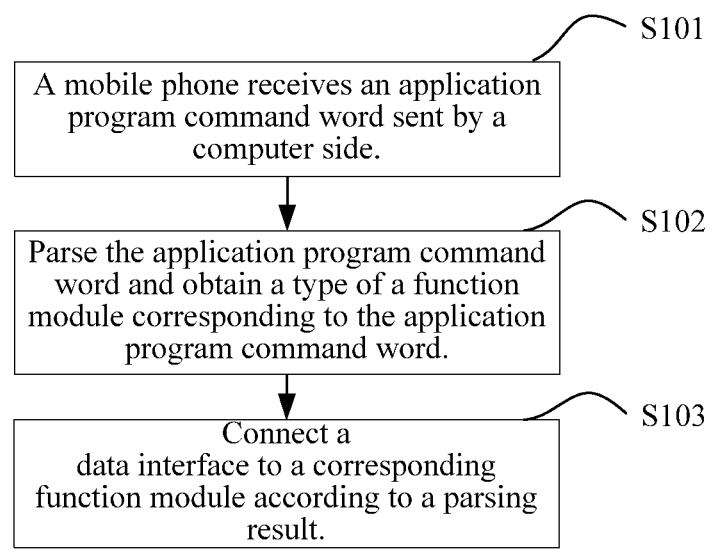
FIG. 1 is a flowchart of a data interface configuration method according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art according to the embodiments of the present invention without creative efforts shall fall within the protection scope of the present invention.

A data interface configuration method provided by an embodiment of the present invention is described first, and the method includes: receiving, by a second device, an application program command word sent by a first device; parsing the application program command word to obtain a type of a function module corresponding to the application program command word according to a preset mapping relationship; and connecting a data interface to a corresponding function module according to a parsing result.

The second device in the preceding solution provides one or more function modules. These function modules have their delivery-attached application program software and the application program software is installed at a first device side. The first device is capable of providing a running environment for the delivery-attached software of the second device. When the second device is connected to the first device through the data interface of the second device, a user may invoke a corresponding function module in the second device through running an application program on the first device, and use hardware resources in the second device to implement function extension for the first device.

The first device may specifically be a personnel computer (such as a desktop computer or a notebook computer), a server, or the like. The second device may specifically be a terminal device such as a mobile phone, a PDA, or a handheld game console. The function modules in the second device may include a GPS module, a modem module, and a camera module. In addition, a storage medium in the second device may also be understood as a type of function module. Currently, a terminal device and a computer implement data connection in a universal serial bus (USB) manner generally. Of course, the application range of the embodiment of the present invention is not limited to a USB data connection manner.

The following uses a desktop computer as a first device and a mobile phone as a second device as an example to further describes the specific implementation of the present invention in details.

After a mobile phone is connected to a computer in a manner such as USB, a mobile phone side and a computer side may both automatically detect the connection and implement basic data transmission between the mobile phone and the computer. However, in this case, the connection does not correspond to a specific function module in the mobile phone. Therefore, a specific application cannot be implemented. The implementation of the prior art is as follows: After a mobile phone is connected to a computer, a selection menu is displayed on the screen of the mobile phone, and according to a user's manual selection, a data interface is connected to a corresponding function module to complete configuration for the data interface, and then, the user is prompted to start running an application program.

However, in the technical solutions provided by the embodiments of the present invention, after a mobile phone is connected to a computer, a user does not need to perform manual configuration, and may directly start an application program on a computer side; and a mobile phone identifies, according to an application program command word sent by the computer side, an application program that currently needs to be run and connects a data interface to a corresponding function module, so that the mobile phone automatically configures the data interface.

FIG. 1 is a flowchart of a data interface configuration method according to an embodiment of the present invention. The method includes the following steps:

S101: A mobile phone receives an application program command word sent by a computer side.

After the mobile phone is connected to a computer, a user does not need to perform manual configuration for connection of a data interface, but may directly start a required application program on the computer. After the user executes an operation of starting the application program, the computer sends the application program command word to the mobile phone.

S102: Parse the application program command word to obtain a type of a function module corresponding to the application program command word.

The application program command word refers to a type of instruction sent from the computer side to the mobile phone, which is used to invoke a corresponding function module in the mobile phone to execute a corresponding function. In this embodiment of the present invention, after the mobile phone receives the application program command word sent by the computer side, the application program command word is parsed first, and according to a parsing result, it is determined which application program is ready to be executed on the computer side and then the type of the function module used by the application program is further determined.

For different application programs, their respective command words have different features. The mobile phone may determine, according to these features, the application program that is ready to be executed on the computer side. In a specific application, a mapping relationship between an application program command word, an application program, and a function module may be saved in a mapping relationship table in advance. Table 1 is a schematic diagram of a mapping table according to an embodiment of the present invention.

TABLE 1

| Application Program | Command Word Format | Function Module |
| --- | --- | --- |
| Dial-up access | AT+"Command content"+/0a0d | Modem |
| PC assistant | AT+"Command content"+/0a0d7e | Storage medium |
| GPS | "Command content"+0x7e | GPS |
| . . . | . . . | |

The first row of table 1 is taken as an example. When a user runs the "dial-up access" application program on the computer side, the command word format sent from the computer side to the mobile phone is as follows:

AT+"Command content"+/0a0d

When the user runs the "dial-up access" application program on the computer side, the mobile phone parses the command word sent by the computer side. According to the prefix part "AT" and the suffix part "/0a0d" of the command word, it may be determined that the dial-up access application program needs to be run currently on the computer side, and it may be further determined that the function module corresponding to the application program is a Modem module.

Similarly, each application program has its corresponding command word format. By presetting a mapping relationship shown in Table 1 in the mobile phone, after the mobile phone receives the format of the command word sent by the computer side, an application program and a function module corresponding to the command word may be determined.

It should be noted that, the mapping relationship table shown in table 1 is only for exemplary description and does not impose any limitation on the solutions of the present invention. For example, the same function module may correspond to a plurality of command word formats.

S103: Connect a data interface to a corresponding function module according to a parsing result.

In S102, the application program that needs to be run on currently the computer side and its corresponding function module have been determined. In this step, the mobile phone further connects the data interface to the corresponding function module to complete configuration for the data interface. It can be understood that the basic data connection between the computer and the mobile phone has been established before. Therefore, this step involves only a change in the logical connection configuration for the data interface. After configuration for the data interface is complete, the computer side may normally invoke the function module in the mobile phone.

It can be seen that, with the foregoing technical solutions, after the mobile phone is connected to the computer, a user can directly start an application program on the computer side without manual configuration. According to an application program command word sent by the computer side, the mobile phone identifies an application program to be run currently and connects the data interface to the corresponding function module, so that the mobile phone automatically configures the data interface.

Besides, when a user needs to change an application program that is currently executed, the user only needs to start a corresponding application program on the computer side to implement automatic configuration for the data interface. For example, when the user is running a "dial-up access" application currently, if a "GPS" application needs to be run, the user may directly start a related application program on the computer side. At this time, the computer side sends, to the mobile phone, the command word shown in column 2 of row 3 in Table 1. The mobile phone side may determine the change of the application program according to the change of a command word format, and then automatically connects the data interface to the GPS module of the mobile phone. The manual operation performed by the user is not required in an entire configuration process.

Figure 2:
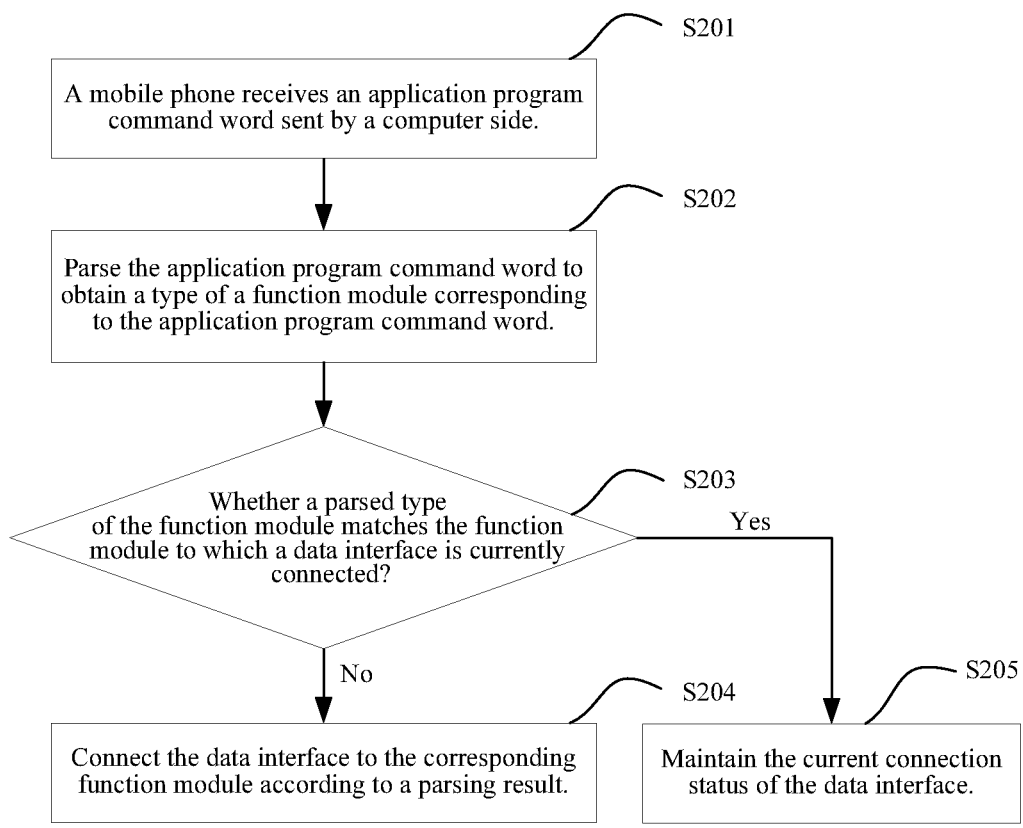
FIG. 2 is a second flowchart of a data interface configuration method according to an embodiment of the present invention.

FIG. 2 is a flowchart of a data interface configuration method according to another embodiment of the present invention. The method includes the following steps:

S201: A mobile phone receives an application program command word sent by a computer side.

S202: Parse the application program command word to obtain a type of a function module corresponding to the application program command word.

S201-S202 are similar to S101-S102, and therefore details are not repeated herein.

S203: Determine whether a parsed type of the function module matches the function module to which a data interface is currently connected. If yes, go to step S205, otherwise, go to step S204.

In this embodiment, after determining an application program that needs to be run currently on the computer side and its corresponding function module, the mobile phone does not directly reconfigure connection to the data interface, but first determines whether a parsed type of the function module matches the function module to which the data interface is currently connected. If the determining result shows unmatched, it indicates that the application program that is currently run on the computer side changes, and at this time, step S204 needs to be further performed. According to the current parsing result, the connection to the data interface is reconfigured to meet an application program running requirement on the computer side. On the contrary, if the determining result is matched, it indicates that the function module to which the data interface is currently connected may still be suitable for the current application program. Therefore, step S205 may be performed, that is, the current connection status of the data interface remains unchanged.

S204: Connect the data interface to a corresponding function module according to a parsing result.

This step is similar to step S103, and details are not repeated herein.

S205: Maintain the current connection status of the data interface.

With the solution provided in this embodiment, the mobile phone may detect when a user needs to change the currently executed application program. In addition, the mobile phone reconfigures the data interface only when the user needs to change the currently executed application program. Compared with the previous embodiment, this embodiment may reduce repeated configuration operations on the mobile phone side, thereby saving system resources of the mobile phone.

Figure 3:
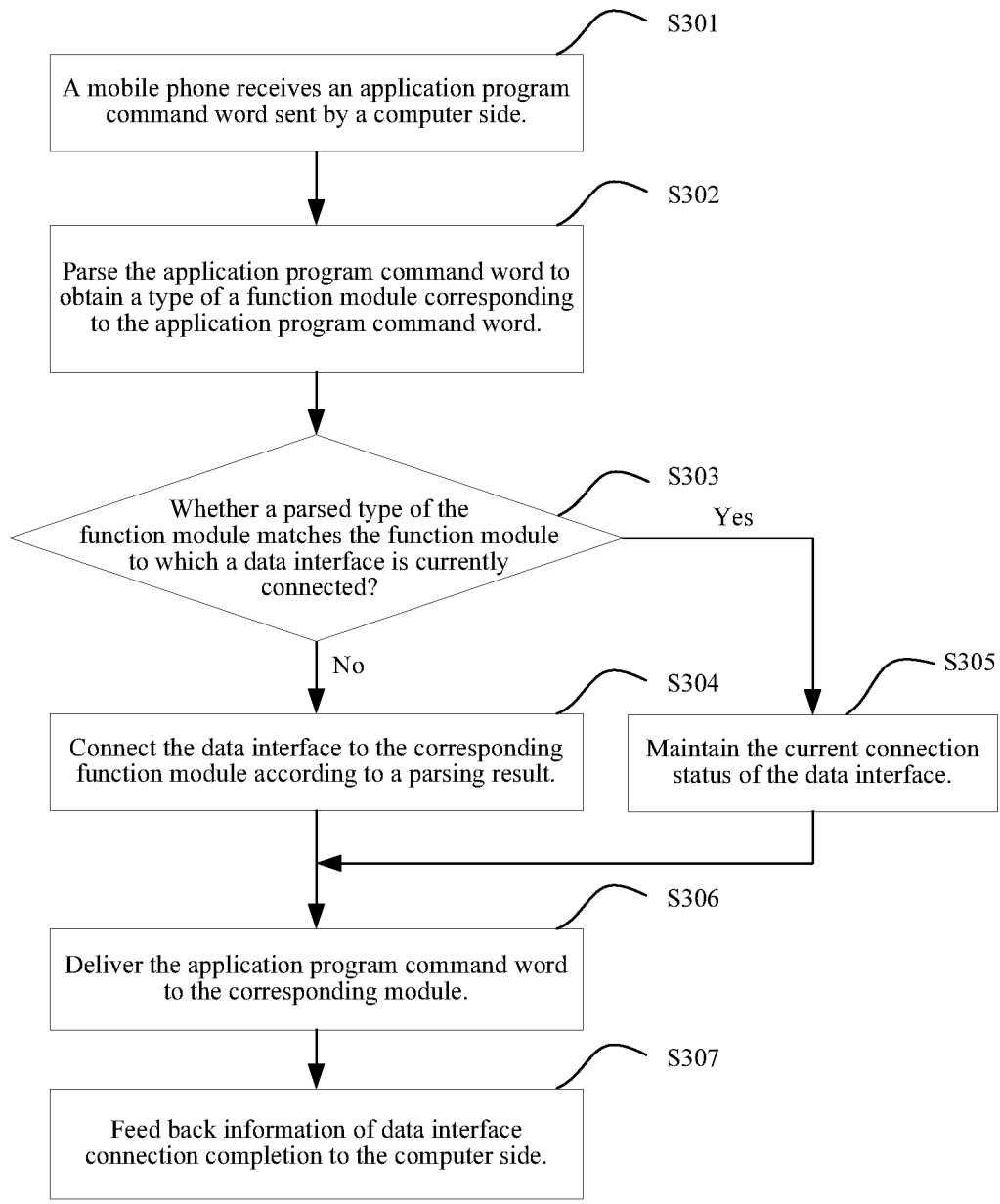
FIG. 3 is a third flowchart of a data interface configuration method according to an embodiment of the present invention.

FIG. 3 is a flowchart of a data interface configuration method according to another embodiment of the present invention. Steps S301-S305 are similar to steps S201-S205, respectively, and are not described herein again. In addition, this embodiment further includes the following steps:

S306: Deliver the application program command word to the corresponding function module.

According to the solution provided in this embodiment of the present invention, a mobile phone may parse all application program command words sent by a computer side. In this embodiment, after the parsing is complete, the mobile phone may further deliver a command word to the corresponding function module so as to ensure that the function module can correctly receive the command word and execute a corresponding function.

S307: Feed back information of data interface connection completion to the computer side.

After connecting the data interface to the corresponding function module, the mobile phone may further feed back the information of data interface connection completion to the computer side. After receiving the information, the computer side may determine that the data interface is configured so as to complete startup of an application program. At this time, a user may start using a corresponding function on the computer. Of course, after the mobile phone connects the data interface to the corresponding function module, other manners may be used to prompt the user that the data interface is configured, for example, a voice prompt. The embodiment of the present invention does not impose any limitation thereto.

It can be understood that steps S306 and S307 are executed after S304 or S305 is executed. Therefore, the execution sequence of S306 and S307 is not limited. In addition, S306 and S307 may also be executed independently.

Figure 4:
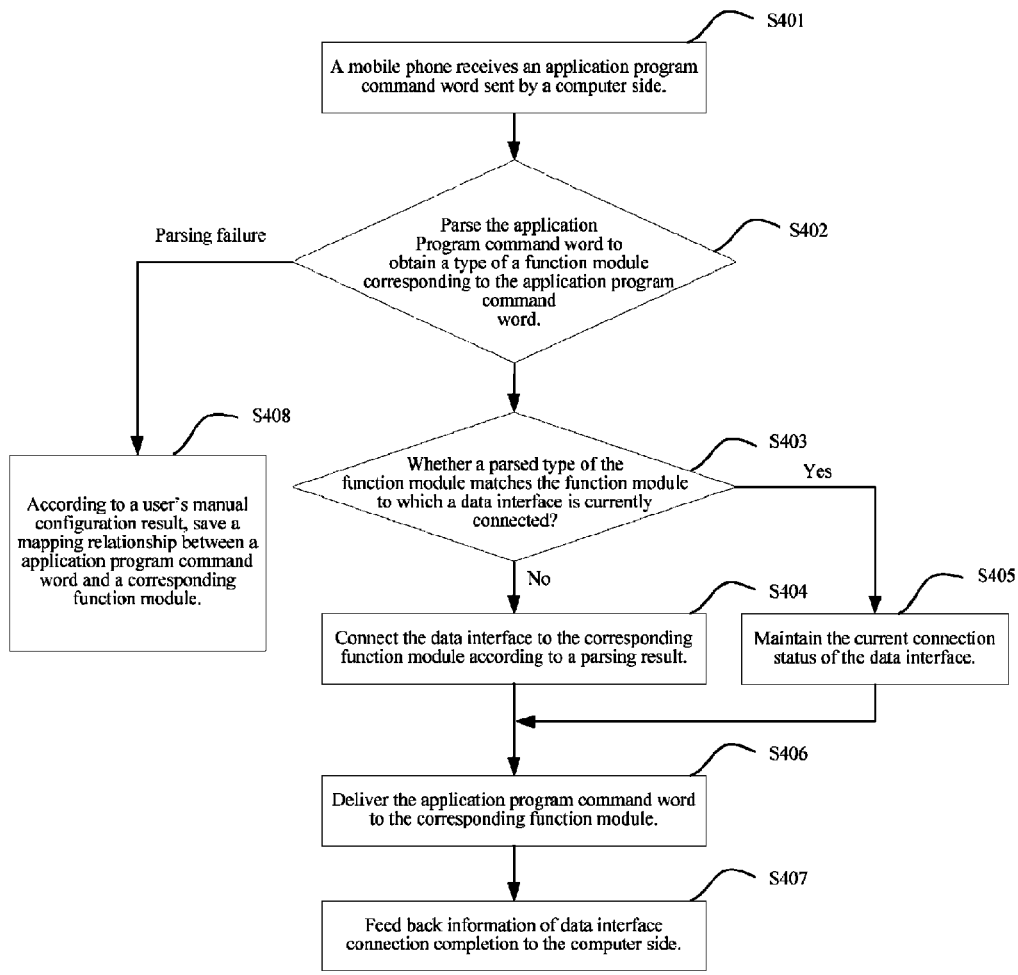
FIG. 4 is a fourth flowchart of a data interface configuration method according to an embodiment of the present invention.

FIG. 4 is a flowchart of a data interface configuration method according to another embodiment of the present invention. Compared with the previous embodiment, this embodiment further considers a situation that an application program command word cannot be parsed successfully.

In an actual application, a mobile phone may occasionally fail to parse a type of a function module corresponding to an application program command word delivered by a computer side. For example, an application program installed on the computer side is developed by a third party. Although a function module in the mobile phone needs to be invoked, a mapping relationship table preset in the mobile phone has no information related to the application program. This leads to a failure to parse a command word. Alternatively, a new command word is added due to the upgrade of a software version, the mapping relationship table preset in the mobile phone may not save the command word, which results in a parsing failure.

For the preceding situations, in step S402 of this embodiment, the mobile phone parses the application program command word. If the parsing fails, the user is prompted to manually configure the data interface. After the user performs manual configuration, the mobile phone obtains a set of new mapping relationships between application program command words and corresponding function modules. Further, in step S408, the mobile phone saves the set of newly obtained mapping relationships according to a user's manual configuration result. In this way, the user just needs to manually configure the data interface only once. When the computer side resends an application program command word of the same format to the mobile phone, the mobile phone side may correctly parse it and automatically configure the data interface.

Through the description of the foregoing method embodiments, a person skilled in the art may clearly understand that the present invention may be implemented by means of software and a necessary general hardware platform, or of course, by means of a hardware, but the former is preferable in many cases. According to such understanding, the technical solutions of the present invention essentially, or the part contributing to the prior art may be implemented in the form of a software product. The computer software product is stored in a storage medium, and includes several instructions for instructing a computer device (which may be a personal computer, a server, a network device, or the like) to perform all or part of the steps of the method provided by each embodiment of the present invention. The storage medium includes: any medium that can store program codes, such as a read-only memory (ROM), a random access memory (RAM), a magnetic disk, or a compact disc.

Figure 5:
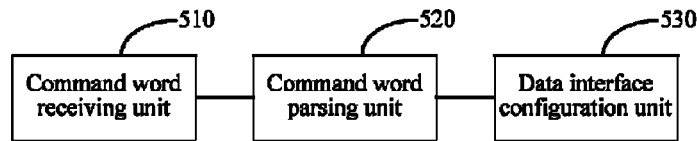
FIG. 5 is a schematic structural diagram of a terminal device according to an embodiment of the present invention.

Corresponding to the foregoing method embodiment, an embodiment of the present invention further provides a terminal device, as shown in FIG. 5. The terminal device may further include: a command word receiving unit 510 configured to receive an application program command word sent by a first device; a command word parsing unit 520 configured to parse the application program command word to obtain a type of a function module corresponding to the application program command word; and a data interface configuration unit 530 configured to connect a data interface to a corresponding function module according to a parsing result of the command word parsing unit 520.

As a second device, the terminal device provides one or more function modules. These function modules have their delivery-attached application program software and the application program software is installed at a first device side. The first device is capable of providing a running environment for the delivery-attached software of the second device. When the second device is connected to the first device through the data interface of the second device, a user may invoke a corresponding function module in the second device through running an application program on the first device, and use hardware resources in the second device to implement function extension for the first device. The first device may specifically be a personnel computer (such as a desktop computer or a notebook computer), a server, or the like. The terminal device may specifically be a mobile phone, a PDA, a handheld game console, or the like. The function modules in the terminal device may include a GPS module, a modem module, and a camera module. In addition, a storage medium in the second device may also be understood as a type of function module.

With the terminal device provided by the embodiment of the present invention, after the terminal device is connected to the computer, a user can directly start an application program on the computer side without manual configuration. According to an application program command word sent by the computer side, the terminal device identifies an application program to be run currently and connects the data interface to the corresponding function module, so that the terminal device automatically configures the data interface.

The data interface configuration unit 530 may specifically include: a determining subunit configured to determine whether the type of the function module parsed by the command word parsing unit 520 matches the function module to which the data interface is currently connected; and a connecting subunit configured to, when the determination result of the determining subunit is yes, connect the data interface to the corresponding function module.

With the solution provided in this embodiment, the terminal device may detect when a user needs to change the currently executed application program. In addition, the terminal device reconfigures the data interface only when the user needs to change the currently executed application program. Compared with the previous embodiment, this embodiment may reduce repeated configuration operations on the terminal device side, thereby saving system resources of the terminal device.

Figure 6:
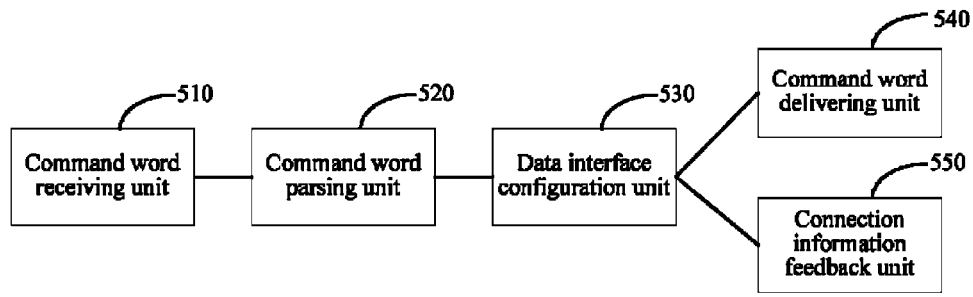
FIG. 6 is a second schematic structural diagram of a terminal device according to an embodiment of the present invention.

Referring to FIG. 6, the terminal device provided by the embodiment of the present invention further includes: a command word delivering unit 540 configured to, after the data interface configuration unit 530 connects the data interface to the corresponding function module, deliver the application program command word to the function module. This ensures that the function module may correctly receive the command word and execute a corresponding function; and a connection information feedback unit 550 configured to, after the data interface configuration unit 530 connects the data interface to the corresponding function module, feeds back information of data interface connection completion to the first device, to instruct the first device to complete startup of the application program.

The command word delivering unit 540 and the connection information feedback unit 550 are optional configuration units. Both of them may be configured in the terminal device at the same time or either of them is configured in the terminal device.

Figure 7:
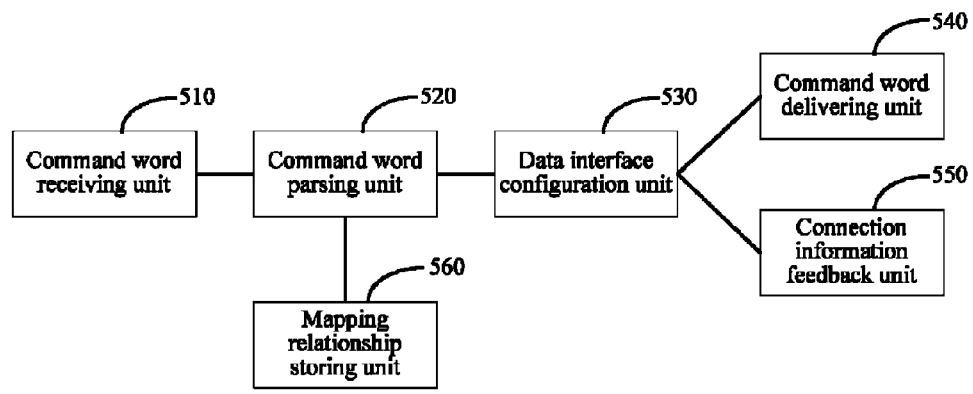
FIG. 7 is a third schematic structural diagram of a terminal device according to an embodiment of the present invention.

Referring to FIG. 7, the terminal device provided by the embodiment of the present invention may further include: a mapping relationship storing unit 560 configured to, when the command word parsing unit cannot parse a currently received application program command word, store a mapping relationship between the currently received application program command word and the corresponding function module according to a user's manual configuration result.

With the solution provided by this embodiment, the terminal device may save a new mapping relationship between a program command word and a corresponding function module according to a user's manual configuration result in a case where the terminal device cannot parse the application program command word. In this way, the user just needs to manually configure the data interface only once. When the first device resends an application program command word of the same format to the terminal device, the terminal device may correctly parse and complete automatic configuration for the data interface.

The apparatus or system embodiments basically correspond to the method embodiments, and therefore reference may be made to the method embodiments for the relevant content. The described apparatus or system embodiments are merely exemplary. The units described as separate parts may or may not be physically separate, and parts displayed as units may or may not be physical units, that is, may be located in one position, or may be distributed on a plurality of network elements. A part of or all of the modules may be selected according to the actual needs to achieve the objectives of the solutions of the embodiments. A person of ordinary skill in the art may understand and implement the embodiments without creative efforts.

It should be understood that in the several embodiments provided by the present application, the disclosed system, apparatus, and method may be implemented by other means without departing from the idea and scope of the present application. The current embodiments are merely exemplary examples, and should not be regarded as a limitation, and the detailed content should not limit the objectives of the application. For example, the division of units or subunits is merely logical function division and can be other division in actual implementation. For example, a plurality of units or subunits is combined together. In addition, a plurality of units or components may be combined or integrated into another system or some features may be ignored or not executed.

In addition, the schematic diagrams illustrating the system, apparatus, method and different embodiments may be combined or integrated with other systems, modules, technologies or methods without departing from the scope of the present invention. In addition, the displayed or discussed mutual couplings or direct couplings or communication connections may be implemented through some interfaces; and the indirect couplings or communication connections between the apparatuses or units may be implemented in electronic, mechanical or other forms.

The foregoing description is merely about the specific embodiments of the present invention. It should be noted that persons of ordinary skill in the art may still make modifications or revisions to the foregoing embodiments thereof, without departing from the principle of the present invention. The modifications or revisions shall fall within the protection scope of the present invention.

What is claimed is:

1. A data interface configuration method, comprising:
receiving, by a second device, an application program command word sent by a first device;
parsing the application program command word;
obtaining a type of a function module corresponding to the application program command word according to a preset mapping relationship;
connecting a data interface to a corresponding function module according to a parsing result, wherein the data interface is a data interface on the second device, and wherein the function module is a function module in the second device; and
connecting the data interface to a second function module of the second device according to a change in the application program command word,
wherein the data interface is connected to the second function module of the second device automatically without manual operation performed by a user, and
wherein after connecting the data interface to the corresponding function module, the method further comprises feeding back, by the second device, information of data interface connection completion to the first device to instruct the first device to complete startup of an application program.

2. The method according to claim 1, wherein connecting the data interface to the corresponding function module according to the parsing result comprises:
determining whether a parsed type of the function module matches a function module to which the data interface is currently connected; and
connecting the data interface to the corresponding function module when the determination indicates that the parsed type of the function module does not match the function module to which the data interface is currently connected.

3. The method according to claim 1, wherein after connecting the data interface to the corresponding function module, the method further comprises delivering the application program command word to the function module.

4. The method according to claim 1, further comprising storing a mapping relationship between the currently received application program command word and a corresponding function module according to a user's manual configuration result when the currently received application program command word cannot be parsed.

5. The method according to claim 1, wherein the preset mapping relationship comprises a table that is pre-stored in the second device, wherein the table comprises a plurality of command word formats and corresponding function modules, and wherein the plurality of command word formats comprise at least one "AT" command.

6. The method according to claim 1, wherein the first device comprises a personal computer, wherein the second device comprises a mobile phone, wherein the personal computer and the mobile phone are communicatively coupled through a universal serial bus cable, and wherein the mobile phone comprises a plurality of function modules including a modem, a storage medium, and a global positioning sensor.

7. A terminal device, comprising:
a non-transitory computer readable medium having instructions stored thereon; and
a computer processor coupled to the non-transitory computer readable medium and configured to execute the instructions to:
receive an application program command word sent by a first device;
parse the application program command word to obtain a type of a function module corresponding to the application program command word;
connect a data interface to a corresponding function module according to a parsing result; and connect the data interface to a second function module of the terminal device according to a change in the application program command word, wherein the data interface is connected to the second function module of the terminal device automatically without manual operation performed by a user, and wherein after the data interface is connected to the corresponding function module, the computer processor is further configured to execute the instructions to feed back, by the second device, information of data interface connection completion to the first device to instruct the first device to complete startup of an application program.

8. The terminal device according to claim 7, wherein the computer processor is further configured to execute the instructions to:

determine whether a type of the function module parsed matches a function module to which the data interface is currently connected; and connect the data interface to the corresponding function module when the type of the function module does not match the function module to which the data interface is currently connected.

9. The terminal device according to claim 7, wherein the computer processor is further configured to execute the instructions to deliver the application program command word to the function module after the data interface is connected to the corresponding function module.

10. The terminal device according to claim 7, wherein the computer processor is further configured to execute the instructions to store a mapping relationship between the currently received application program command word and a corresponding function module according to a user's manual configuration result when the currently received application program command word cannot be parsed.

11. The terminal device according to claim 7, wherein the preset mapping relationship comprises a table that is pre-stored in the terminal device, wherein the table comprises a plurality of command word formats and corresponding function modules, and wherein the plurality of command word formats comprise at least one "AT" command.

12. The terminal device according to claim 7, wherein the first device comprises a personal computer, wherein the terminal device comprises a mobile phone, wherein the personal computer and the mobile phone are communicatively coupled through a universal serial bus cable, and wherein the mobile phone comprises a plurality of function modules including a modem, a storage medium, and a global positioning sensor.

13. A non-transitory computer readable medium having instructions stored thereon that when executed by a processor cause the processor to perform a method comprising:

receiving, by a second device, an application program command word sent by a first device;

parsing the application program command word;

obtaining a type of a function module corresponding to the application program command word according to a preset mapping relationship; and connecting a data interface to a corresponding function module according to a parsing result, wherein the data interface is a data interface on the second device, and wherein the function module is a function module in the second device;

connecting the data interface to a second function module of the second device according to a change in the application program command word, wherein the data interface is connected to the second function module of the second device automatically without manual operation performed by a user, and wherein after connecting the data interface to the corresponding function module, the method further comprises feeding back, by the second device, information of data interface connection completion to the first device to instruct the first device to complete startup of an application program.

* * * * *